United States Patent
Brown et al.

(10) Patent No.: US 6,553,505 B1
(45) Date of Patent: Apr. 22, 2003

(54) METHOD AND APPARATUS FOR PERFORMING CLOCK TIMING DE-SKEW

(75) Inventors: Russell W. Brown, Nepean (CA); Bruce Leshay, West Boylston, MA (US); Mehran Aliahmad, Ottawa (CA)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/515,462

(22) Filed: Feb. 29, 2000

(51) Int. Cl.7 .................................................. G06F 1/04
(52) U.S. Cl. ........................................ 713/401; 713/503
(58) Field of Search ................................ 713/400, 401, 713/501, 503

(56) References Cited

U.S. PATENT DOCUMENTS

| | | | | |
|---|---|---|---|---|
| 4,965,884 A | * | 10/1990 | Okura et al. ................. | 375/354 |
| 5,467,464 A | * | 11/1995 | Oprescu et al. .............. | 713/400 |
| 5,621,774 A | * | 4/1997 | Ishibashi et al. ............. | 375/371 |
| 5,778,214 A | * | 7/1998 | Taya et al. ................... | 713/400 |
| 5,872,959 A | * | 2/1999 | Nguyen et al. .............. | 395/552 |
| 6,418,537 B1 | * | 7/2002 | Yang et al. .................. | 713/400 |

* cited by examiner

*Primary Examiner*—Dennis M. Butler
(74) *Attorney, Agent, or Firm*—David M. Sigmond

(57) ABSTRACT

An embodiment of the invention provides a method for performing timing de-skew in order to properly receive digital computer information. A sequence of N clock pulses are generated at intervals having phases offset from one another by T/N, where N is at least 2, T is a duration of one bit-cell time, and one cycle of each of the clock phases has a duration of 2T. A test signal is generated at a transmitting portion. The test signal is received, and one of the generated sequences of clock pulses which is aligned with the test signal is identified. The identified one of the generated sequences of clock pulses is used to determine which one of the generated sequences of clock pulses and which polarity to use to receive data.

60 Claims, 7 Drawing Sheets

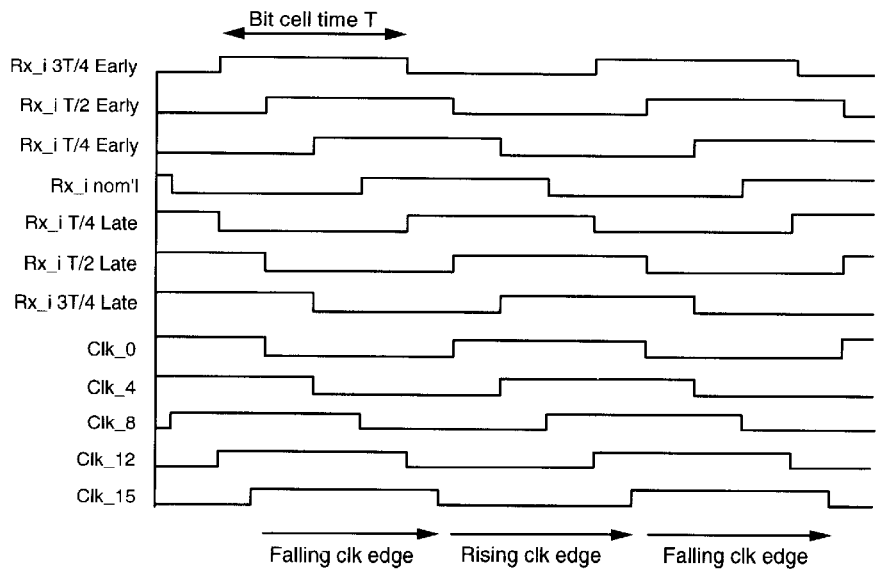

Fig. 2

| Rx Data Skew | CLK phase at Data Rising | CLK phase at Data Falling | Desired CLK for the "Even" bit cells |
|---|---|---|---|
| nominal data | clk_8 falling | clk_8 rising | clk_0 rising |
| T/4 Early | clk_4 falling | clk_4 rising | clk_12 falling |
| T/2 Early | clk_0 falling | clk_0 rising | clk_8 falling |
| 3T/4 Early | clk_12 rising | clk_12 falling | clk_4 falling |
| T/4 Late | clk_12 falling | clk_12 rising | clk_4 rising |
| T/2 Late | clk_0 rising | clk_8 falling | clk_8 rising |
| 3T/4 Late | clk_4 rising | clk_4 falling | clk_12 rising |

Fig. 3

METHOD AND APPARATUS FOR PERFORMING CLOCK TIMING DE-SKEW

RESERVATION OF COPYRIGHT

This patent document contains material subject to copyright protection. The copyright owner has no objection to the facsimile reproduction by anyone of the patent document, as it appears in the U.S. Patent and Trademark Office patent files or records, but otherwise reserves all copyright rights whatsoever.

BACKGROUND OF THE INVENTION

1. Field of the Invention

Aspects of the invention relate to methods for receiving information over a parallel data bus structure. Other aspects of the invention relate to apparatuses for receiving information over a parallel bus structure.

2. Description of Background Information

As channel data rates are increased, timing skew of data paths relative to the clock limits the ability to correctly receive synchronous data. For example, the maximum timing skew in a Small Computer Standard Interface (SCSI) Ultra-3 system with a 12.5 ns bit-cell time is ±3.75 ns. The next generation SCSI, Ultra-4, is planned to operate with similar interconnect structures, but with a bit-cell time of 6.25 ns. The uncorrected 7.5 ns peak-peak skew, of the Ultra-4, exceeds the bit-cell time, thereby preventing correct data reception.

SUMMARY

An embodiment of the invention provides a method of performing timing de-skew in order to properly receive digital computer information. N sequences of clock pulses are generated, the generated sequences having phases offset from one another by intervals of T/N, where N is at least 2 and T is a duration of one bit-cell time, and where one cycle of each of the sequences has a duration of 2T. A transmitting portion generates a test signal. The test signal is received at a receiving potion. An identifying portion identifies which one of the generated sequences of clock pulses and corresponding polarities is aligned with the test signal. The identified one of the generated sequences of clock pulses and the corresponding polarities are used to determine which one of the generated sequences of clock pulses and corresponding polarities to use to receive the digital computer information.

BRIEF DESCRIPTION OF THE DRAWINGS

Illustrative embodiments of the invention are described with reference to the following drawings in which:

FIG. 2 is a timing diagram showing data and clocks being received at different timings;

FIG. 3 is a table showing a relationship among the data received at different timing phases and the differently phased clocks;

DETAILED DESCRIPTION

Figure 1A:
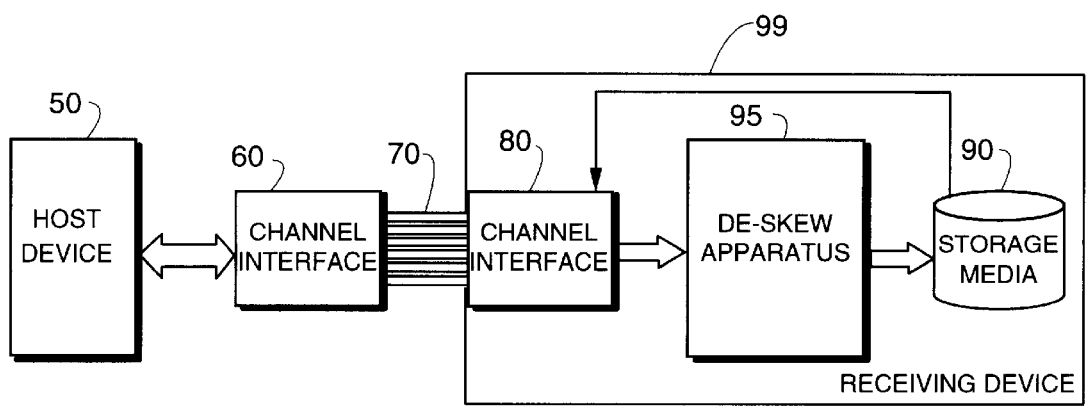
FIG. 1A is high-level functional block diagram of a transmitting device, for example, a host device, coupled to a data storage device via a parallel interface and de-skew device.

One embodiment of the present invention is shown in FIG. 1A. A transmitting device, for example, a host device 50, is coupled to receiving device 99 via a parallel connection channel 70. Specifically, in the illustrated embodiment, the parallel connection channel 70 comprises a parallel cable terminating at each end with a channel interface 60 and 80. Receiving device 99 may comprise a disk drive. Receiving device 99 may also be, for example, a computer system, tape drive, scanner, printer, optical disk drive and any other peripheral device that connects to a computer system through a parallel data bus may be used. The parallel data bus structure may be, for example, SCSI, PCI, PCI-X, or ATA. As shown in FIG. 1A, a channel interface 80 is coupled to a storage media 90 via a de-skew apparatus 95, and is coupled to those lines of channel 70 from which receiving device 99 is receiving information (digital signals), e.g., payload data transmitted in the form of an oscillating signal over each such line.

Figure 1B:
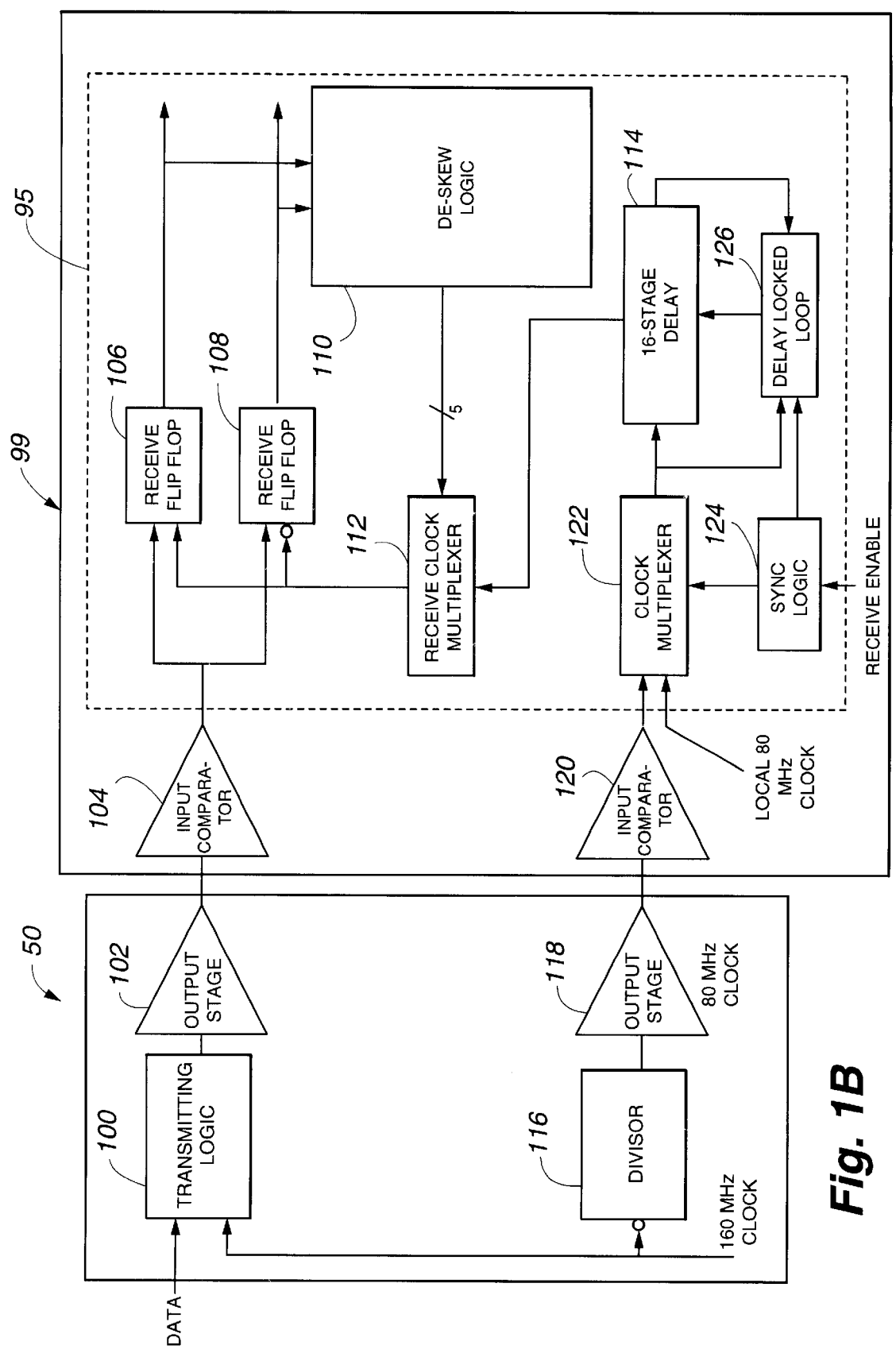
FIG. 1B is a block diagram illustrating an embodiment of the invention.

FIG. 1B shows a block diagram of a specific embodiment of a de-skew apparatus 95 for one given line of the bus. Accordingly, in the illustrated embodiment, transmitting logic 100, of host device 50, receives, as input, bits of data and a 160 Mhz clock. Each bit is output by transmitting logic 100 to output stage 102 through an interconnect (not shown) into input comparator 104 of the receiving device 99 and then into receive flip flops 106 and 108, also of the receiving device 99. As can be seen in FIG. 1B, the receiving device 99 includes de-skew apparatus 95, which includes receive flip flops 106 and 108, de-skew logic 110, receive clock multiplexer 112, 16-stage delay 114, clock multiplexer 122, sync logic 124, and delay locked loop (DLL) 126. Each received bit is passed from either receive flip flops 106 or 108 to de-skew logic 110 when the embodiment is in the de-skewing mode.

Receive clock multiplexer 112 acts as a selector. The multiplexer 112 receives as input a plurality of clocks at different phases. In this embodiment, 16 clock signals having clock phases, equally spaced at intervals of T/16, where T is a bit-cell time, are input to the receive clock multiplexer 112 from 16-stage delay 114. In addition, an output from de-skew logic 110 is input to receive clock multiplexer 112, and acts as a selector to select one of the plurality of input clock phases.

As can be seen in FIG. 1B, the output of receive clock multiplexer 112 is a clock signal which is supplied to receive flip flop 106 and is inverted and supplied to receive flip flop 108.

In the host device 50, transmitting logic 100 and divisor 116 each receive the same 160 MHz clock signal. Divisor 116 divides the clock by 2 and outputs an 80 MHz clock through output stage 118, through the interconnect (not shown), through input comparator 120, in the receiving device 99, and into clock multiplexer 122. Clock multiplexer 122 also receives as input a local 80 MHz clock and receives a control input from sync logic 124.

Sync logic 124 receives, as input, a receive enable signal, which indicates that bits are being received from the host device 50. When the receive enable signal is enabled, sync logic 124 enables a signal to clock multiplexer 122 such that clock multiplexer 122 will select an 80 MHz clock, which originates from the input 160 MHz clock in the host device 50, and clock multiplexer 122 provides the clock signal as input to 16-stage delay 114 and delay lock loop (DLL) 126. DLL 126 provides a control signal to 16-stage delay 114 to regulate 16-stage delay 114 to match the bit-cell time T, i.e. to slow down or speed up the phased clocks provided by 16-stage delay 114.

Sync logic 124 also provides a sync signal to DLL 126 indicating that either the receive enable signal has changed from zero to one or from one to zero. When the receive enable signal changes, the clock source changes to either the local 80 MHz clock or the 80 MHz clock from the transmitting device. The sync signal informs the DLL 126 to briefly ignore the clock signals due to a change of clock source.

As can be seen in FIG. 1B, when the receive enable signal is not enabled, the clock multiplexer 122 selects the local 80 MHz clock in the receive device 99 as input to the clock multiplexer 122 in order to keep the delay at T/16, in this embodiment. Clock multiplexer 122 then provides the clock to 16-stage delay 114 and DLL 126.

The output of 16-stage delay 114 is a plurality of clock signals having equally spaced clock phases which are provided to receive clock multiplexer 112. In this embodiment, the 16-stage delay 114 outputs 16 clocks having equally spaced clock phases at intervals of T/N, where T is bit-cell time and N in this embodiment is 16, however, N may be any integer value greater than 1.

The embodiment of the invention is more clearly explained with reference to FIGS. 2 and 3. FIG. 2 shows the receipt of a test pattern at a nominal phase and at various other phases. The test pattern is made up of a series of alternating ones and zeros, each lasting one bit-cell time T. As can be seen in FIG. 2 and as shown in FIG. 3, the bit pattern received at the nominal timing has a data rising edge aligned with a falling edge of clock 8 and a data falling edge aligned with a rising edge of clock 8. Thus, if clock 8 were used in an attempt to read data arriving at a nominal timing, it would be impossible to ascertain the value of the data because the data changes at precisely the time of the clock edge.

The de-skew logic 110, in this embodiment, must analyze the received test pattern through at least several clock cycles in order to determine the proper clock phase to use. In this embodiment, the ideal clock is one which has an edge in a center portion of a bit-cell having a "one" value of the test pattern. For example, with reference to FIG. 2, when a "one" bit of the test pattern is received at nominal timing, the received signal read at the rising edge of any of clocks 0 through 7 would show a "one" being received. The received signal read at the falling edge of any of clocks 0 through 7 would show a "zero" being received. At the rising and falling edges of clock 8, since the received data signal changes from a "one" to a "zero" and a "zero" to a "one", respectively, an indeterminate value would be detected. Using the rising edge of clocks 9 through 15 to detect the received data signal, a "zero" would be detected. Using the falling edges of clocks 9 through 15, a "one" would be detected. Thus, in this particular example, by examining the detected data signal at the rising and falling edges of the different clock phases, the de-skew logic 110 would have detected that clock 8 is aligned with the received test pattern and that the falling edge of clock 8 is aligned with the rising edge of the test pattern. Since a clock edge occurring at a middle portion of a bit-cell is desired, the de-skew logic 110 would indicate to receive clock multiplexer 112 to select a clock edge which is at a phase of T/2 advanced from the just-found aligned clock edge, in this example this would be the rising edge of clock 0. See FIGS. 2 and 3.

As another example, with reference to FIG. 2, suppose that the test pattern arrives at T/4 early timing. The falling edge of clocks 0 through 3 would show a "zero" being received. The rising edges of clocks 0 through 3 would show a "one" being received. The rising and falling edges of clock 4 would be indeterminate since the data changes at that instance. The falling edges of clocks 5 through 15 would show a "one" being received. The rising edges of clocks 5 through 15 would show a "zero" being received. Thus the de-skew logic 110 would be able to determine that because the falling edges of clocks 0–3 show a "zero" and the falling edges of clocks 5–15" show a "one" that the falling edge of clock 4 aligns with the rising edge of the data and the rising edge of clock 4 aligns with the falling edge of the data. From this information de-skew logic 110 would be able to determine that the ideal clock would be the falling edge of clock 12. See FIGS. 2 and 3.

Thus, the de-skew logic 110 determines which of the clock phases, including clock polarity, has rising or falling edges aligned with rising or falling edges of the data, and based on the determination calculates which one of the clock phases has an edge occurring at a middle portion of a bit-cell time, where a "one" of the test pattern occurs during the bit-cell time.

Figure 4A:
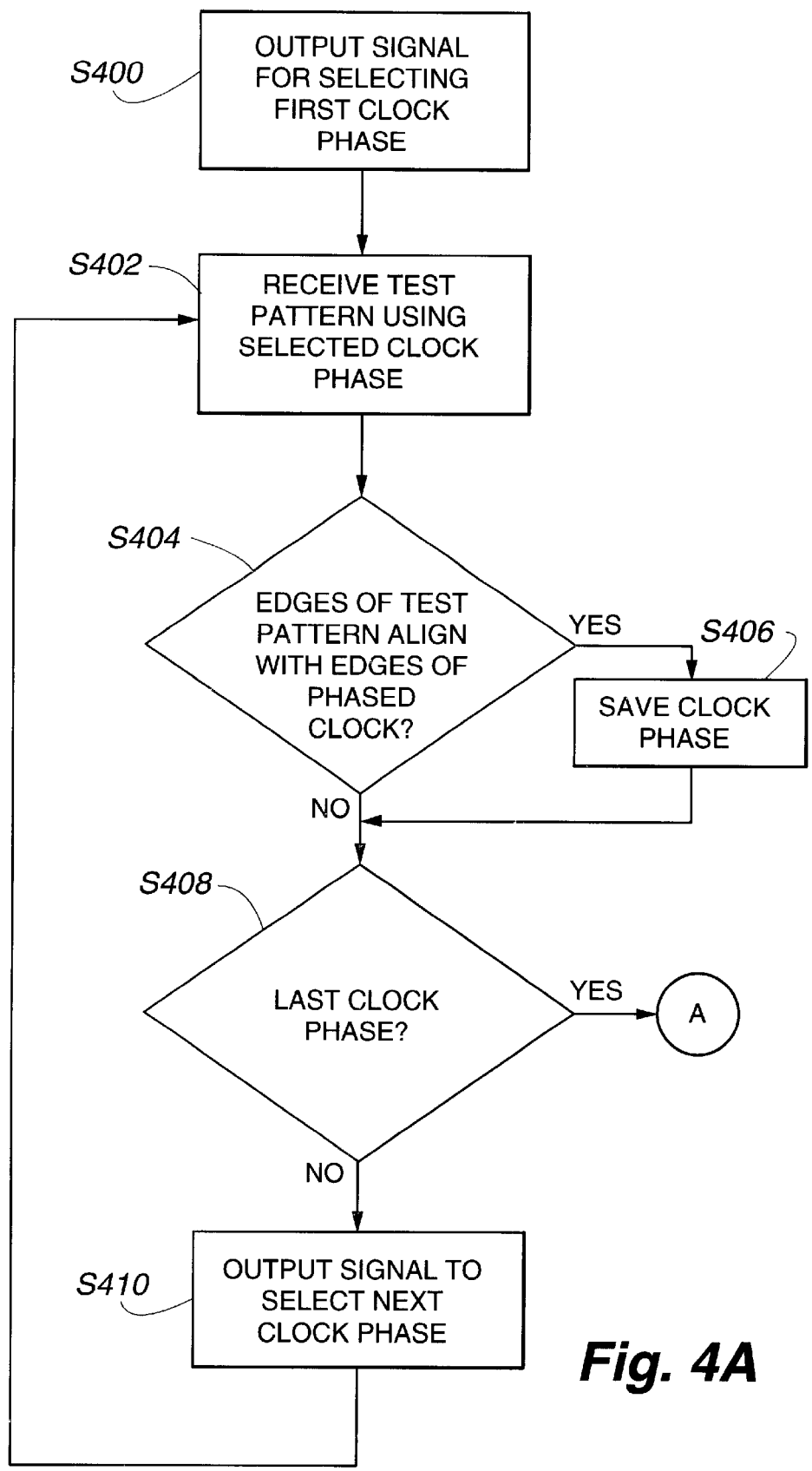
FIGS. 4A and 4B provide a flowchart which illustrates processing in an embodiment of the invention.
Figure 4B:
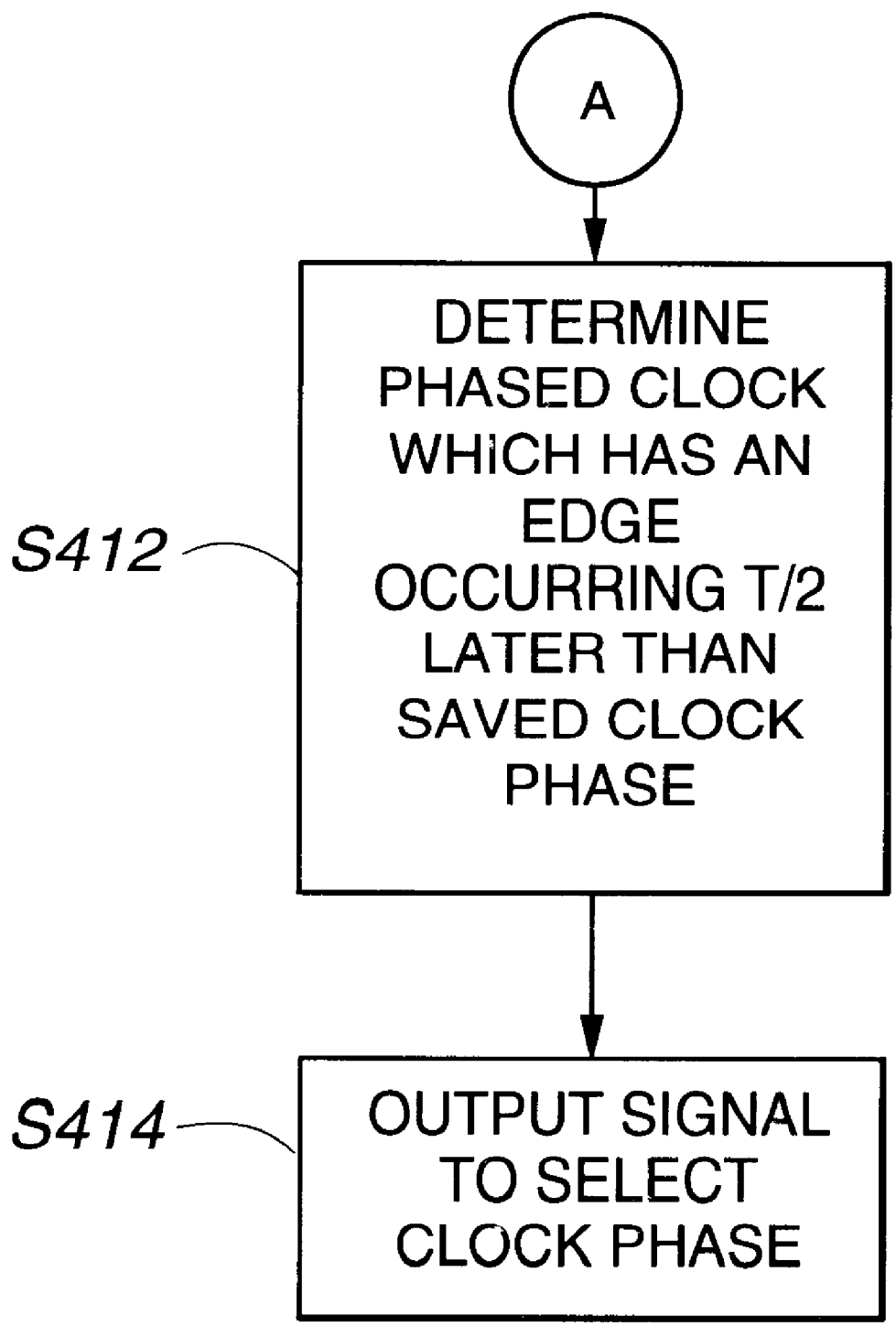

FIGS. 4A and 4B are a flowchart of a process by which the de-skew logic 110 selects the properly phased clock.

At S400, the de-skew logic 110 causes a signal to be output to receive clock multiplexer 112 to select the first clock phase, clock 0.

At S402, the test pattern of alternating zeros and ones is received through receive flip flops 106 and 108, clocked at the selected clock phase.

At S404, the de-skew logic 110 determines, in the manner described above, which of the clock phases has edges aligned with the data signals of alternating ones and zeros and the clock polarity of the aligned clock. This is determined by observing several cycles of the test data using several different clock phases, as described earlier. In other words, the test pattern would be read at the falling and rising edges of the different clock phases, and the aligned clock phase is determined based on observing what appears to be a transition of a read ones portion of the pattern changing to zeros, or vice versa. Thus, if several cycles of test data had not yet been observed, S404 would not be able to determine which phased clock aligns with the edges of the test pattern. If the aligned clock is found, the aligned clock phase and polarity are saved at S406.

If S404 cannot yet determine which clock phase aligns with the test pattern, S408 is performed to determine whether the last clock phase has been examined. If the last clock phase was not yet examined, then, S410 is performed to output a signal to the receive clock multiplexer 112 to select the next clock phase and proceed to S402.

S412 is performed if, at S408 a determination is made that the last clock phase was examined. At S412, a clock phase having an edge phased ½ bit-cell time T (T/2) later than the saved clock phase is determined, such that the polarity, rising or falling edge, occurs at a central portion of a bit-cell having a "one" value of the test pattern.

At S414, a signal is output to the receive clock multiplexer 112 to select the determined phased clock having the T/2 later phasing.

A shorter calibration update could be performed by causing the de-skew logic 110 to initially output to the receive clock multiplexer 112 a value based on the previous de-skewing operation and incrementing or decrementing the clock phases, as required, in order to locate the new data edges for recalculating new values for de-skewed clock phases.

Figure 5A:
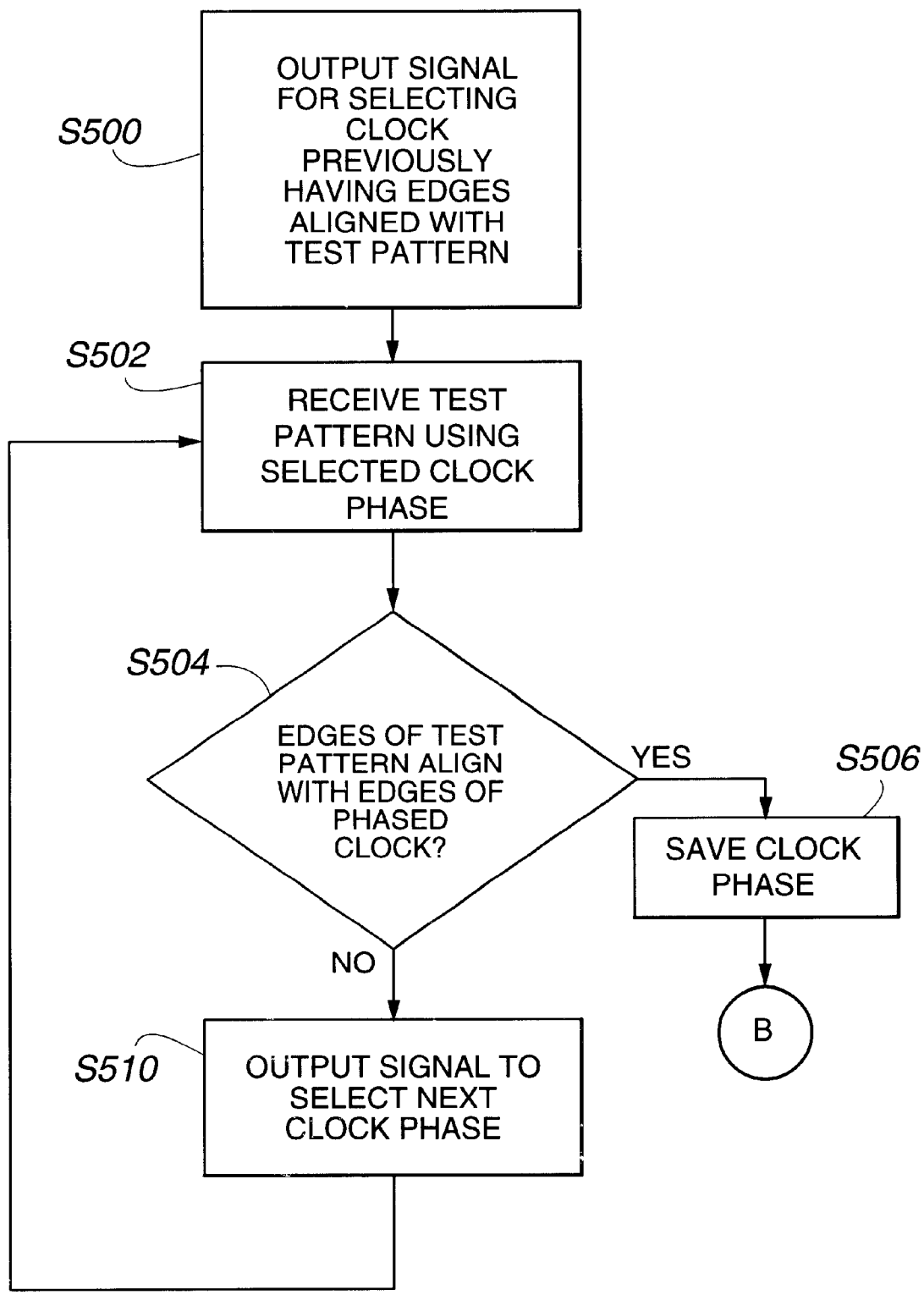
FIGS. 5A and 5B provide a flowchart which illustrates processing in another embodiment of the invention.
Figure 5B:
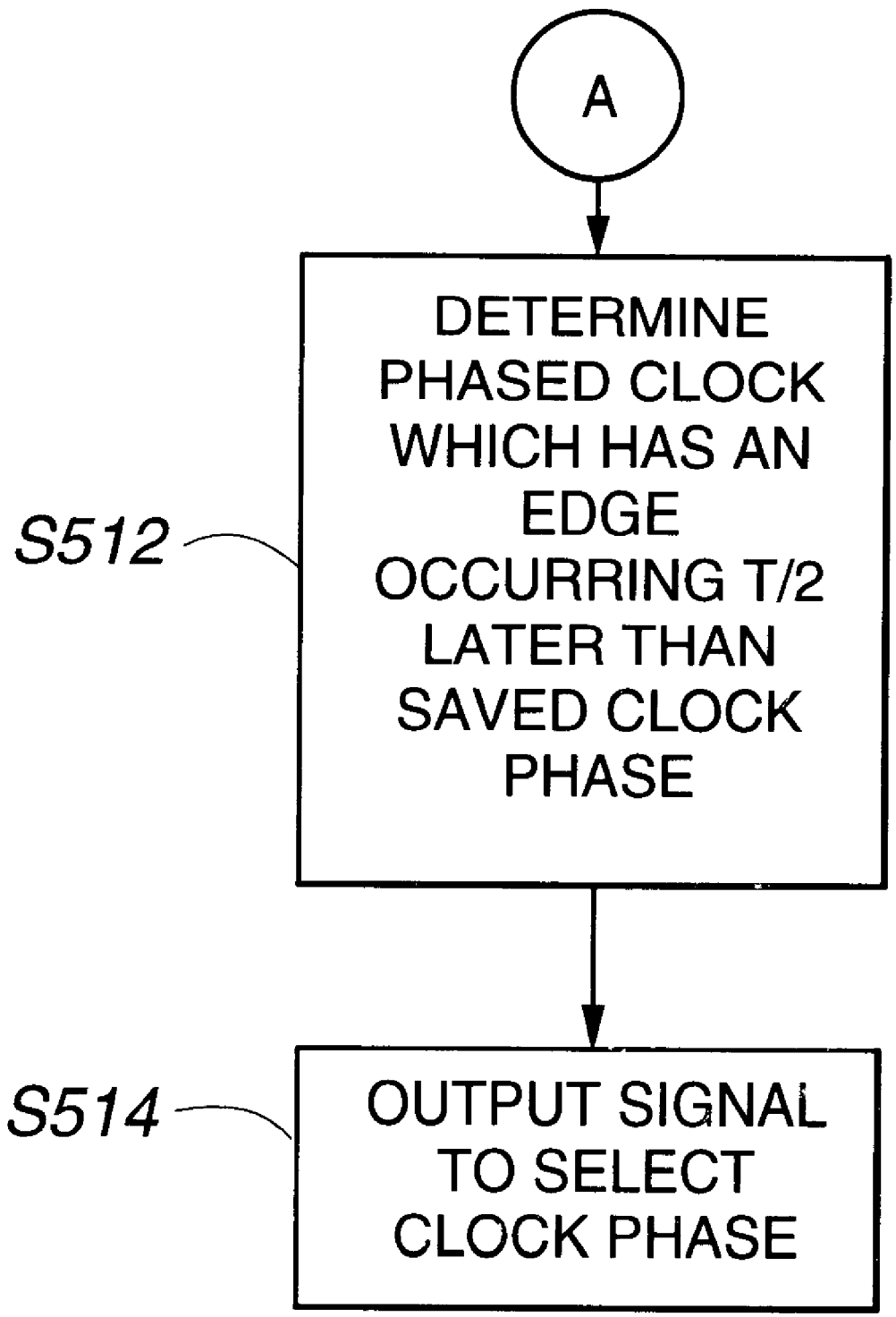

FIGS. 5A and 5B are a flow chart of a process by which the de-skew logic 110 selects the properly phased clock using the above-mentioned shorter calibration update.

At S500, the de-skew logic 110 outputs a signal to the receive clock multiplexer 112 causing the receive clock multiplexer 112 to select the clock phase and polarity which was previously selected as the de-skewed clock.

At S502, the test pattern of alternating zeros and ones is received through receive flip flops 106 and 108, and clocked at the selected clock phase.

At S504, the de-skew logic 110 determines, in the manner described above, which of the clock phases has edges aligned with the data signals of alternating ones and zeros. This is determined by observing several cycles of the test data using several different clock phases, as described earlier. In other words, the test pattern would be read at the falling and rising edges of the different clock phases, and the aligned clock phase is determined based on observing what appears to be a transition of a read ones portion of the pattern changing to zeros, or vice versa. Thus, if several cycles of test data had not yet been observed, S504 would not be able to determine which phased clock aligns with the edges of the test pattern. If the aligned clock is found, the aligned clock phase and polarity are saved at S506.

If the edges of the test pattern do not align with the edges of the phased clock, then S510 is performed to output a signal to the receive clock multiplexer 112 to select the next clock phase and proceed to S502. Note that the next clock phase is derived by either incrementing to the next clock phase, for example, moving from clock phase 0 to clock phase 1, or by decrementing to the next clock phase, for example moving from clock phase 1 to clock phase 0. A check for wrap around is performed (i.e., in a 16 clock phase system, if decrementing from clock phase 0, then clock phase 15 is next, or if incrementing from clock phase 15, then clock phase 0 is next). At S510 the de-skew logic 110 outputs a signal to cause the receive clock multiplexer 112 to select the next clock phase and repeat act S502.

At S512, a clock phase having an edge phased ½ bit-cell time T (T/2) later than the saved clock phase is determined, such that the polarity, rising or falling edge, occurs at a central portion of a bit-cell having a "one" value of the test pattern.

At S514, a signal is output to the receive clock multiplexer 112 to select the determined phased clock having the T/2 later phasing.

A major de-skew calibration includes scanning of all clock phases, for example, in this embodiment 16 clock phases, and identifying the clock phase that aligns with the rising and falling edges of the data pattern. The appropriate de-skewed clock phases for best receiver set-up and hold timing is then calculated from this data. Thus, the de-skew logic 110 receives the test pattern clock at the different clock phases, and in a major de-skew calibration, all of the 16 clock phases, and aligns the rising and falling edges of the data pattern using the results from both even and odd received flip flops and outputs a value to the receive clock multiplexer 112 to select a clock phase having an edge at a middle portion of a bit-cell time T.

The example in FIG. 1B shows a two bit register sampling the received data on the rising and falling edges of one clock phase at a time, and requires the de-skew logic 110 to scan all clock phases to locate the data pattern edges. An ultimate implementation could use 2N registers to capture all of the N samples of the clock phases in a single 2T sampling interval. This approach would require more circuitry, but would calibrate the clock phase more quickly. The ideal clock phase could be determined in two bit-cells.

It may also be useful to reduce noise effects by using an average of several skew measurements to calculate the correct de-skew clock phase.

The above-mentioned embodiments allow a unique measure of skews of up to ±T to be accommodated. Skews greater than ±T could be accommodated, but would require a lower frequency "sync" pattern at the end of the 101010 training pattern to correctly identify the "odd" and "even" bit-cells. For example, a "sync" pattern of "11001100" could be used.

Although the above-mentioned embodiments describe the ideal clock as having an edge in a center portion of a bit-cell of an "even" or "one" of the test pattern, the ideal clock may also be a center portion of an "odd" or "zero" portion of the test pattern.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular means, materials, and embodiments, it is understood that the invention is not limited to the particulars disclosed. The invention extends to all equivalent structures, means, and uses which are within the scope of the appended claims.

We claim as our invention:

1. A method of performing timing de-skew in order to properly receive digital computer information, the method comprising:
   generating N sequences of clock pulses, the generated sequences of clock pulses having phases offset from one another by intervals of T/N, where N is at least 2 and T is a duration of one bit-cell time, and where one cycle of each of the sequences has a duration of 2T;
   generating at a transmitting portion a test signal;
   receiving the test signal;
   identifying which one of the generated sequences of clock pulses and corresponding polarities has edges aligned with edges of the test signal; and
   using the identified one of the generated sequences of clock pulses and the corresponding polarities to determine another one of the generated sequences of clock pulses and corresponding polarities to use to receive the digital computer information.

2. The method of claim 1, wherein the test signal includes a pattern of zeros and ones in alternating bit cells.

3. The method of claim 1, wherein the pulses of the test signal at a given level, generated at the transmitting portion, are centered on edges of a clock at the transmitting portion.

4. The method of claim 2, wherein the determined one of the generated sequences of clock pulses has an edge aligned with a center portion of a bit-cell having one of the ones pattern of the test signal.

5. The method of claim 1, wherein N is 16.

6. The method of claim 2, wherein the identifying comprises analyzing a plurality of the generated sequences of clock pulses to determine the one of the generated sequences of clock pulses having edges aligned with rising and falling edges of the test signal.

7. The method of claim 1, wherein the identifying comprises:
setting a current one of the generated sequences of clock pulses to a previously identified one of the generated sequences of clock pulses from a previously performed timing de-skew;
determining whether the current one of the generated sequences of clock pulses aligns with the rising and the falling edges of the test signal;
performing one of incrementing and decrementing the current one of the generated sequences of clock pulses when the determining does not determine that the current one of the generated sequences of clock pulses aligns with the rising and the falling edges of the test signal; and
repeating the determining and the performing until the determining determines that the current one of the generated sequences of clock pulses aligns with the rising and the falling edges of the test signal.

8. The method of claim 1, wherein:
the generating of the sequences of clock pulses comprises:
generating the sequences of clock pulses such that N of the sequences are generated in parallel; and
the identifying comprises:
analyzing the N sequences in parallel.

9. An apparatus for performing timing de-skew, comprising:
a generating portion for generating N sequences of clock pulses, the generated sequences of clock pulses having phases offset from one another by intervals of T/N, where N is at least 2 and T is a duration of one bit-cell time, and where one cycle of each of the sequences has a duration of 2T;
a transmitting portion for transmitting a test signal;
a receiving portion for receiving the test signal, the receiving portion comprising:
a data receiver for receiving bits of the test signal;
an identifying portion for receiving the bits of the test signal from the data receiver and identifying which one of the generated sequences of clock pulses and corresponding polarities has aligned with rising and falling edges of the test signal; and
a determining mechanism to use the identified one of the generated sequences of clock pulses and the corresponding polarities to determine another one of the generated sequences of clock pulses and the corresponding polarities to use to receive digital computer information.

10. The apparatus of claim 9, wherein the test signal includes a pattern of zeros and ones in alternating bit cells.

11. The apparatus of claim 10, wherein the apparatus further comprises:
a selector for receiving an output from the determining mechanism and receiving the generated sequences of clock pulses from the generating portion, an output of the selector being a clock signal selected from one of the generated sequences of clock pulses based upon the received output from the determining mechanism, the clock signal being provided as an input clock to the data receiver.

12. The apparatus of claim 10, wherein the determining mechanism determines one of the generated sequences of clock pulses having an edge aligned with a center portion of a bit-cell having one of the ones pattern of the test signal.

13. The apparatus of claim 9, wherein N is 16.

14. The apparatus of claim 11, wherein the data receiver further comprises:
a first and a second flip flop, the first flip flop being arranged to receive all even numbered arriving bits of the test signal, the second flip flop being arranged to receive all odd numbered arriving bits of the test signal, the clock signal from the selector being provided to one of the first and the second flip flops and an inverted one of the clock signal from the selector being provided to another of the first and the second flip flops, an output of the first flip flop and an output of the second flip flop being provided to the identifying portion.

15. The apparatus of claim 10, wherein the receiving portion further comprises:
N data receivers, each of the data receivers for receiving a currently transmitted bit of the test signal;
each of the data receivers including:
a first and second flip flop, the first flip flop being arranged to receive all even numbered arriving bits of the test signal from the transmitting portion, the second flip flop being arranged to receive all odd numbered arriving bits of the test signal from the transmitting portion, a respective one of the receiving sequences of clock pulses being provided as a first receive clock signal to one of the first and the second flip flops and an inverted one of the first receive clock signal being provided to another of the first and second flip flops as a second receive clock signal, an output of the first flip flop and an output of the second flip flop being provided to identifying portion;
an output of the determining mechanism, based on results of the identifying portion, indicating an ideal one of the generated sequences of clock pulses and corresponding polarity to provide to the data receivers.

16. A method of providing a de-skewed clock signal, comprising:
receiving a test signal;
receiving a clock signal;
generating delayed clock signals in response to the clock signal, wherein the delayed clock signals are offset from one another by less than one bit-cell time of the clock signal;
identifying one of the delayed clock signals that is aligned with the test signal as an aligned clock signal; and
providing another one of the delayed clock signals as the de-skewed clock signal in response to the aligned clock signal.

17. The method of claim 16, wherein receiving the test signal and the clock signal includes obtaining the test signal and the clock signal at a channel interface that communicates with a parallel data bus.

18. The method of claim 17, wherein the parallel data bus is a SCSI, PCI, PCI-X or ATA bus.

19. The method of claim 16, wherein the delayed clock signals are offset from one another by intervals of T/N, where N is at least 2 and T is the bit-cell time.

20. The method of claim 16, wherein identifying the aligned clock signal includes selecting one of the delayed clock signals with rising edges that are aligned with rising edges of the test signal.

21. The method of claim 16, wherein identifying the aligned clock signal includes selecting one of the delayed clock signals with the rising edges that are aligned with falling edges of the test signal.

22. The method of claim 16, wherein identifying the aligned clock signal includes sequentially comparing the delayed clock signals to the test signal.

23. The method of claim 16, wherein identifying the aligned clock signal includes comparing inverted and non-inverted versions of the delayed clock signals to alternating bits of the test signal.

24. The method of claim 16, wherein identifying the aligned clock signal includes selecting the delayed clock signals with a multiplexer and comparing the selected delayed clock signals with the test signal.

25. The method of claim 16, wherein identifying the aligned clock signal includes selecting the delayed clock signals with a multiplexer, and providing the de-skewed clock signal includes selecting one of the delayed clock signals with the multiplexer.

26. The method of claim 16, wherein identifying the aligned clock signal includes selecting the delayed clock signals with a multiplexer and comparing the selected delayed clock signals with the test signal, and providing the de-skewed clock signal includes selecting one of the delayed clock signals with the multiplexer.

27. The method of claim 16, wherein providing the de-skewed clock signal includes selecting one of the delayed clock signals that is shifted by one-half the bit-cell time relative to the aligned clock signal.

28. The method of claim 16, wherein the de-skewed clock signal includes an edge that is centered relative to a bit-cell of the test signal.

29. The method of claim 16, wherein the de-skewed clock signal includes an edge that is centered relative to a bit-cell of the aligned clock signal.

30. The method of claim 16, wherein the de-skewed clock signal includes an edge that is centered relative to a bit-cell of the test signal and is centered relative to a bit-cell of the aligned clock signal.

31. A method of providing a de-skewed clock signal, comprising:

receiving a test signal from a parallel data bus, wherein the test signal has a bit-cell time;

receiving a clock signal from the parallel data bus, wherein the clock signal has the bit-cell time;

generating delayed clock signals in response to the clock signal, wherein the delayed clock signals are offset from one another by intervals of T/N, where N is at least 2 and T is the bit-cell time;

identifying one of the delayed clock signals as an aligned clock signal, wherein edges of the aligned clock signal are aligned with rising and falling edges of the test signal; and providing another one of the delayed clock signals as the de-skewed clock signal in response to the aligned clock signal.

32. The method of claim 31, wherein identifying the aligned clock signal includes sequentially comparing the delayed clock signals to the test signal.

33. The method of claim 32, wherein identifying the aligned clock signal includes comparing inverted and non-inverted versions of the delayed clock signals to alternating bits of the test signal.

34. The method of claim 31, wherein identifying the aligned clock signal includes selecting the delayed clock signals with a multiplexer and comparing the selected delayed clock signals with the test signal.

35. The method of claim 31, wherein identifying the aligned clock signal includes selecting the delayed clock signals with a multiplexer, and providing the de-skewed clock signal includes selecting one of the delayed clock signals with the multiplexer.

36. The method of claim 31, wherein identifying the aligned clock signal includes selecting the delayed clock signals with a multiplexer and comparing the selected delayed clock signals with the test signal, and providing the de-skewed clock signal includes selecting one of the delayed clock signals with the multiplexer.

37. The method of claim 31, wherein providing the de-skewed clock signal includes selecting one of the delayed clock signals that is shifted by one-half the bit-cell time relative to the aligned clock signal.

38. The method of claim 31, wherein the de-skewed clock signal includes an edge that is centered relative to a bit-cell of the test signal.

39. The method of claim 31, wherein the de-skewed clock signal includes an edge that is centered relative to a bit-cell of the aligned clock signal.

40. The method of claim 31, wherein the de-skewed clock signal includes an edge that is centered relative to a bit-cell of the test signal and is centered relative to a bit-cell of the aligned clock signal.

41. A method of providing a de-skewed clock signal, comprising:

receiving a test signal;

receiving a clock signal;

generating delayed clock signals in response to the clock signal, wherein the delayed clock signals are offset from one another by less than one bit-cell time of the clock signal;

identifying one of the delayed clock signals that is aligned with the test signal as an aligned clock signal by sequentially selecting the delayed clock signals with a multiplexer and sequentially comparing the selected delayed clock signals with the test signal; and providing another one of the delayed clock signals as the de-skewed clock signal in response to the aligned clock signal by selecting another one of the delayed clock signals with the multiplexer.

42. The method of claim 41, wherein receiving the test signal and the clock signal includes obtaining the test signal and the clock signal at a channel interface that communicates with a parallel data bus.

43. The method of claim 42, wherein the parallel data bus is a SCSI, PCI, PCI-X or ATA bus.

44. The method of claim 41, wherein the delayed clock signals are offset from one another by intervals of T/N, where N is at least 2 and T is the bit-cell time.

45. The method of claim 41, wherein identifying the aligned clock signal includes selecting one of the delayed clock signals with edges that are aligned with rising or falling edges of the test signal.

46. The method of claim 41, wherein identifying the aligned clock signal includes comparing inverted and non-inverted versions of the delayed clock signals to alternating bits of the test signal.

47. The method of claim 41, wherein providing the de-skewed clock signal includes selecting one of the delayed clock signals that is shifted by one-half the bit-cell time relative to the aligned clock signal.

48. The method of claim 41, wherein the de-skewed clock signal includes an edge that is centered relative to a bit-cell of the test signal.

49. The method of claim 41, wherein the de-skewed clock signal includes an edge that is centered relative to a bit-cell of the aligned clock signal.

50. The method of claim 41, wherein the de-skewed clock signal includes an edge that is centered relative to a bit-cell of the test signal and is centered relative to a bit-cell of the aligned clock signal.

51. A method of providing a de-skewed clock signal, comprising:

receiving a test signal;

receiving a clock signal;

generating delayed clock signals in response to the clock signal, wherein the delayed clock signals are offset from one another by less than one bit-cell time of the clock signal;

identifying one of the delayed clock signals that is aligned with the test signal as an aligned clock signal by comparing inverted and non-inverted versions of the delayed clock signals to alternating bits of the test signal; and providing another one of the delayed clock signals as the de-skewed clock signal in response to the aligned clock signal.

52. The method of claim 51, wherein receiving the test signal and the clock signal includes obtaining the test signal and the clock signal at a channel interface that communicates with a parallel data bus.

53. The method of claim 52, wherein the parallel data bus is a SCSI, PCI, PCI-X or ATA bus.

54. The method of claim 51, wherein the delayed clock signals are offset from one another by intervals of T/N, where N is at least 2 and T is the bit-cell time.

55. The method of claim 51, wherein identifying the aligned clock signal includes selecting one of the delayed clock signals with edges that are aligned with rising or falling edges of the test signal.

56. The method of claim 51, wherein identifying the aligned clock signal includes sequentially selecting the delayed clock signals with a multiplexer, and providing the de-skewed clock signal includes selecting one of the delayed clock signals with the multiplexer.

57. The method of claim 51, wherein providing the de-skewed clock signal includes selecting one of the delayed clock signals that is shifted by one-half the bit-cell time relative to the aligned clock signal.

58. The method of claim 51, wherein the de-skewed clock signal includes an edge that is centered relative to a bit-cell of the test signal.

59. The method of claim 51, wherein the de-skewed clock signal includes an edge that is centered relative to a bit-cell of the aligned clock signal.

60. The method of claim 51, wherein the de-skewed clock signal includes an edge that is centered relative to a bit-cell of the test signal and is centered relative to a bit-cell of the aligned clock signal.

* * * * *